No. 862,714. PATENTED AUG. 6, 1907.
B. V. CONSTANTINOV.
VALVE.
APPLICATION FILED OCT. 22, 1906.
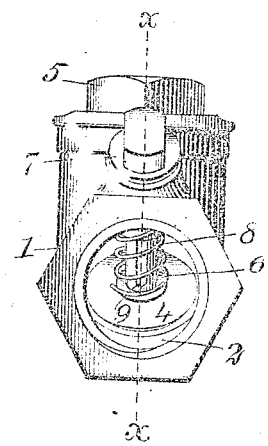
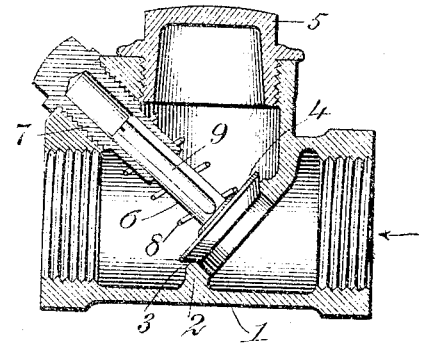
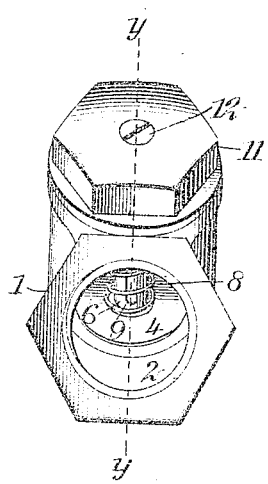
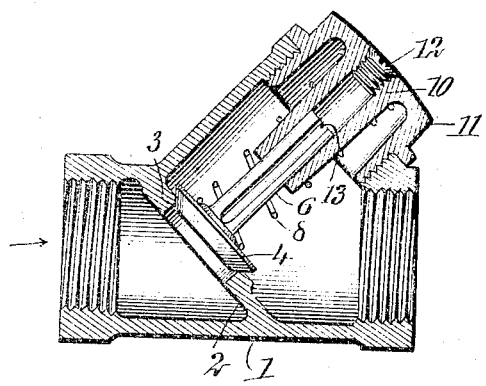
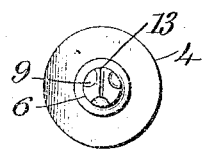
WITNESSES
INVENTOR
Boris V. Constantinov
BY Munn & Co
ATTORNEYS

UNITED STATES PATENT OFFICE.

BORIS V. CONSTANTINOV, OF NEW YORK, N. Y.

VALVE.

No. 862,714.

Specification of Letters Patent.

Patented Aug. 6, 1907.

Application filed October 22, 1906. Serial No. 339,963.

*To all whom it may concern:*

Be it known that I, BORIS V. CONSTANTINOV, a subject of the Czar of Russia, and a resident of the city of New York, borough of Manhattan, in the county and State of New York, have invented a new and Improved Valve, of which the following is a full, clear, and exact description.

This invention relates to improvements in valves for water, steam, or like pipes, an object being to so arrange a pressure-actuated valve that it will open uniformly throughout its circumference, thus permitting or an even and uninterrupted flow of liquid around the valve.

Other objects of the invention will appear in the general description.

I will describe a valve embodying my invention and then point out the novel features in the appended claims.

Reference is to be had to the accompanying drawings, forming a part of this specification, in which similar characters of reference indicate corresponding parts in all the figures.

Figure 1 is an end view of a valve embodying my invention; Fig. 2 is a section on the line x—x of Fig. 1; Fig. 3 is an end view showing a modification; Fig. 4 is a section on the line y—y of Fig. 3; and Fig. 5 shows the valve in plan.

Referring first to the example of my improvement shown in Figs. 1 and 2, 1 designates the valve casing, to which conducting pipes are to be attached in the usual manner, and within the casing is an inclined partition 2, having an opening the wall of which forms a seat 3, for a disk valve 4. At the top the casing has an opening which is normally closed by a screw cap 5, and through this opening the valve may be inserted or removed. The valve stem 6 is movable in a guide, here shown as a tubular extension projecting from a plug 7, the latter being threaded into the wall of the casing in alinement with the seat 3. The valve is held yieldingly against its seat by means of a coiled spring 8, surrounding the stem and extension and engaging at one end with the valve and at the other end with the valve casing. The stem 6 is longitudinally channeled, as indicated at 9, so as to prevent the possible forming of a water cushion within the guide; in other words, when the valve is forced open any water that may be within the guide will pass out through the channel or channels 9 and therefore will offer no resistance to the opening of the valve.

In Figs. 3 and 4 the construction differs from that just described in that the screw-cap 5 is dispensed with and the plug 11 corresponding to the plug 7 is made of sufficient diameter to admit the valve 4 to the casing through the opening into which the plug is threaded when said plug is displaced. The bore of the tubular extension of the plug 11, as shown in Fig. 4, is extended through the outer end of the plug and is normally closed by a screw 12.

In the operation, when the valve or cock at the outlet end of the pipe is opened, the pressure of water or the like on the lower side of the valve will force the same open, leaving a uniform space between the valve and its seat throughout the circumference of the valve, which is not the case when the valve is hinged at one side. When the outlet cock is closed, the water pressure will be equalized on both sides of the valve, so that the spring 8 will move the valve to closed position.

Having thus described my invention, I claim as new and desire to secure by Letters Patent:

In a valve casing, an inclined partition having an opening forming a valve seat, a plug threaded into said casing in alinement with said opening and having a tubular extension projecting within the casing, a valve for said seat having a stem guided in said tubular extension, and a screw-cap threaded into and opening in the casing above said valve.

In testimony whereof I have signed my name to this specification in the presence of two subscribing witnesses.

BORIS V. CONSTANTINOV.

Witnesses:
CHAS. W. PHILIPBAD,
T. K. SCHWARTZAH.